(12) United States Patent
Shet et al.

(10) Patent No.: US 10,803,229 B2
(45) Date of Patent: Oct. 13, 2020

(54) HYBRID SYSTEM AND METHOD FOR DATA AND FILE CONVERSION ACROSS COMPUTING DEVICES AND PLATFORMS

(71) Applicant: THINXTREAM TECHNOLOGIES PTD. LTD., Singapore (SG)

(72) Inventors: Sanjiv Shrikant Shet, Bangalore (IN); Hema Mundkur, Bangalore (IN); Ranga Raj, Bangalore (IN); Teck Lee Low, Singapore (SG)

(73) Assignee: THINXTREAM TECHNOLOGIES PTE. LTD., Singapore (SG)

(*) Notice: Subject to any disclaimer, the term of this patent is extended or adjusted under 35 U.S.C. 154(b) by 441 days.

(21) Appl. No.: 14/801,385

(22) Filed: Jul. 16, 2015

(65) Prior Publication Data
US 2017/0017615 A1      Jan. 19, 2017

(51) Int. Cl.
*G06F 17/00*      (2019.01)
*G06F 40/106*      (2020.01)
(Continued)

(52) U.S. Cl.
CPC .......... *G06F 40/106* (2020.01); *G06F 3/1206* (2013.01); *G06F 3/1247* (2013.01);
(Continued)

(58) Field of Classification Search
CPC .. G06F 17/212; G06F 17/218; G06F 17/2264; G06F 3/1247; G06F 3/1278;
(Continued)

(56) References Cited

U.S. PATENT DOCUMENTS 6,476,930 B1 * 11/2002 Roberts ................. G06F 17/243
                                                      358/1.13
6,618,167 B1 *  9/2003 Shah .................... G06F 3/1205
                                                      358/1.13
(Continued)

FOREIGN PATENT DOCUMENTS

WO      2014120624      8/2014

OTHER PUBLICATIONS

Quick et al., Forensic Collection of Cloud Storage Data: Does the Act of Collection Result in Changes to the Data or its Metadata? Elsevier 2013, pp. 266-277.*
(Continued)

*Primary Examiner* — Cong-Lac Huynh
(74) *Attorney, Agent, or Firm* — Michael D. Eisenberg

(57) ABSTRACT

Embodiments disclosed include a computer-automated system including a processing unit coupled to a memory element and having instructions encoded thereon, the instructions cause the system to: via a network, receive a document in a first format, and via an assessment engine, determine the first format of the received document. The assessment engine is also configured to determine if the determined first format can be converted to a second desired format for printing or display, and if the determined first format can be converted to the second desired format, a conversion engine is caused to convert the received document to the second desired format. If the determined first format cannot be converted to the second desired format, a network routing engine routes the document over the network to a cloud-based conversion engine. Further, the cloud-based conversion engine is messaged over the network, wherein the message further incorporates an instruction to convert the routed document from the first format to the desired second format. The computer-automated system can then receive, over the network, from the cloud-based con-
(Continued)

verter, the routed document, in the desired second format, and print or display the received routed document, in the desired second format.

6 Claims, 3 Drawing Sheets

(51) Int. Cl.
  *G06F 3/12* (2006.01)
  *G06F 40/117* (2020.01)
  *G06F 40/151* (2020.01)
  *G06F 40/226* (2020.01)

(52) U.S. Cl.
  CPC .......... *G06F 3/1287* (2013.01); *G06F 3/1289* (2013.01); *G06F 3/1292* (2013.01); *G06F 40/117* (2020.01); *G06F 40/151* (2020.01); *G06F 40/226* (2020.01)

(58) Field of Classification Search
  CPC .... G06F 3/1292; G06F 3/1206; G06F 3/1289; G06F 40/106; G06F 40/117; G06F 40/151; G06F 3/1287
  USPC .......................................................... 715/249
  See application file for complete search history.

(56) References Cited

U.S. PATENT DOCUMENTS

| | | | | |
|---|---|---|---|---|
| 7,310,693 B2* | 12/2007 | Delaplace | G06F 3/1208 | 358/1.1 |
| 7,539,766 B1* | 5/2009 | Strong | G06F 17/30905 | 709/203 |
| 8,693,022 B2* | 4/2014 | Bhatia | G06K 15/1859 | 358/1.14 |
| 8,902,456 B2* | 12/2014 | Robinson | G06F 3/1206 | 358/1.15 |
| 8,922,814 B2* | 12/2014 | Mochizuki | G06F 1/3209 | 358/1.14 |
| 8,947,696 B1* | 2/2015 | Uyttendaele | G06F 3/1203 | 358/1.15 |
| 8,949,258 B2* | 2/2015 | Pryor-Miller | G06F 17/289 | 707/756 |
| 9,007,637 B2* | 4/2015 | Kulkarni | G06F 3/1205 | 358/1.13 |
| 9,619,440 B2 | 4/2017 | Kawara | G06F 17/214 | |
| 2001/0002470 A1* | 5/2001 | Inohara | G06F 17/30076 | |
| 2001/0039540 A1* | 11/2001 | Hofmann | G06F 9/541 | |
| 2002/0116416 A1* | 8/2002 | Tesch | G06F 9/543 | 715/209 |
| 2002/0194227 A1* | 12/2002 | Day | G06F 17/2247 | 715/234 |
| 2003/0037038 A1* | 2/2003 | Block | G06F 16/86 | |
| 2003/0041095 A1* | 2/2003 | Konda | H04L 67/2823 | 709/201 |
| 2003/0050963 A1* | 3/2003 | Lamming | G06F 16/9577 | 709/203 |
| 2003/0144969 A1* | 7/2003 | Coyne | G06Q 10/06 | 705/400 |
| 2005/0183010 A1* | 8/2005 | Iwasaki | G06F 3/1204 | 715/246 |
| 2006/0007466 A1* | 1/2006 | Ben-Yehuda | G06F 16/88 | 358/1.13 |
| 2006/0010148 A1* | 1/2006 | Sattler | G06F 17/2247 | |
| 2006/0041840 A1* | 2/2006 | Blair | G06F 17/227 | 715/249 |
| 2006/0050288 A1* | 3/2006 | Aschenbrenner | H04N 1/603 | 358/1.9 |
| 2006/0200763 A1* | 9/2006 | Michaelsen | G06F 17/217 | 715/244 |
| 2008/0144066 A1 | 6/2008 | Ferlitsch | | |
| 2008/0208830 A1* | 8/2008 | Lauckhart | G06F 16/332 | |
| 2009/0043794 A1* | 2/2009 | Rosenberg | G06Q 10/00 | |
| 2010/0067807 A1* | 3/2010 | Kim | G07D 7/0047 | 382/218 |
| 2012/0096344 A1* | 4/2012 | Ho | G06F 17/211 | 715/249 |
| 2012/0226823 A1* | 9/2012 | Livnat | G06F 21/10 | 709/246 |
| 2012/0293820 A1* | 11/2012 | Mizoguchi | H04N 1/00411 | 358/1.13 |
| 2013/0111326 A1* | 5/2013 | Lockhart | G06Q 10/00 | 715/234 |
| 2013/0111335 A1 | 5/2013 | Tse | | |
| 2013/0155464 A1 | 6/2013 | Bearchell | | |
| 2013/0194634 A1 | 8/2013 | Sankaranarasimhan et al. | | |
| 2013/0321649 A1* | 12/2013 | Yamamoto | H04N 5/23229 | 348/207.1 |
| 2014/0029047 A1* | 1/2014 | Giannetti | G06F 3/1212 | 358/1.15 |
| 2014/0136961 A1* | 5/2014 | Mai | G06F 17/2264 | 715/249 |
| 2014/0146355 A1* | 5/2014 | Kawara | G06Q 10/10 | 358/1.15 |
| 2014/0215391 A1* | 7/2014 | Little | G06F 17/2288 | 715/810 |
| 2014/0368865 A1* | 12/2014 | Gutnik | G06F 3/1222 | 358/1.15 |
| 2015/0067494 A1* | 3/2015 | Hattori | G06F 17/212 | 715/274 |
| 2015/0199161 A1* | 7/2015 | Gutnik | G06F 3/1296 | 358/1.15 |
| 2016/0259601 A1* | 9/2016 | Dalaa | G06F 3/1204 | |
| 2017/0315965 A1* | 11/2017 | Pirvu | G06F 17/30011 | |
| 2018/0165867 A1* | 6/2018 | Kuhn | G06T 7/11 | |
| 2018/0232348 A1* | 8/2018 | Kerr | G06F 17/241 | |

OTHER PUBLICATIONS

Lu et al., Virtualized Screen: A Third Element for Cloud—Mobile Convergence, IEEE, pp. 1-8. (Year: 2011).*
Hilton et al., Refactoring Local to Cloud Data Types for Mobile Apps, ACM 2014, pp. 83-92. (Year: 2014).*

* cited by examiner

HYBRID SYSTEM AND METHOD FOR DATA AND FILE CONVERSION ACROSS COMPUTING DEVICES AND PLATFORMS

BACKGROUND

Field

Hybrid Document Converter

This disclosure relates to a hybrid document converter (i.e. document format conversions) for display and printing functionalities, and the application of the conversions to mobile devices. Document format conversion for display and printing is a key functionality of productivity applications in computing devices. This functionality is now required on the smaller processing powered mobile devices. There are however, conflicting requirements of quality/fidelity and processing speed. While cloud-based conversion engines can provide high fidelity of the rendered output, user perception of the speed is poor due to the need to transfer data from the device to the cloud and back. On the other hand, in-device conversion algorithms appear to operate faster, but suffer from low quality rendered output, as the software does not support all the features of the document format.

Related Art

A large number of current systems and applications running on systems or mobile devices use local rendering for all document formats or leverage the Mobile Operating System's preview capability. This results in an inaccurate rendering or an inability to render documents. Some users employ cloud-based conversion with clones of applications (e.g., Open Office vs. Microsoft Office). Yet again, this results in an inaccurate rendering.

Another problem with cloud-based offerings is the workflow is from the mobile device to the cloud and from the cloud to the mobile device, which translates to the device being addressable from the cloud—i.e., having a public IP address or a known domain address. This results in two problems—1) security and spam related issues which translate to a need for white listing of users, and 2) lack of predictability or visibility of the progress of the print job (e.g., it could take anywhere from a couple of minutes to a half an hour without any feedback on status to the user, which is frustrating).

Since most network connections are asymmetric bandwidth (i.e., upload is much slower than download), upload performance optimization is key, which is disclosed herein as an innovative solution to the above problems.

SUMMARY

Embodiments disclosed include a computer-automated system including: a processing unit, a memory element coupled to the processing unit; a means for communicating over a network; wherein the computer system is configured to: via the network, receive a document in a first format; via an assessment engine, determine the first format of the received document. The assessment engine is also configured to determine if the determined first format can be converted to a second desired format for printing or display, and if the determined first format can be converted to the second desired format, a conversion engine is caused to convert the received document to the second desired format. If the determined first format cannot be converted to the second desired format, a network routing engine routes the document over the network to a cloud-based converter (e.g., a conversion engine). Further, the cloud-based conversion engine is messaged over the network, wherein the message further includes an instruction to convert the routed document from the first format to the desired second format. The computer-automated system can then receive, over the network, from the cloud-based converter, the routed document, in the desired second format, and print or display the received routed document, in the desired second format.

An embodiment includes, in a computer-automated system having a processing unit coupled to a memory element and having instructions encoded thereon, a method including, over a network, receiving a document in a first format. The method further includes via an assessment engine, determining the first format of the received document, and determining if the determined first format can be converted to a second desired format for printing or display. If the determined first format can be converted to the second desired format, a conversion engine is configured for converting the received document to the second desired format. Conversely, if the determined first format cannot be converted to the second desired format, a routing engine is configured for routing the document over the network, to a cloud-based converter (e.g., a conversion engine). The method further includes messaging the cloud-based converter over the network; the messaging includes instructing the cloud-based converter to convert the routed document from the first format to the desired second format. In the method, the computer-automated system is configured for receiving, over the network, from the cloud-based converter, the routed document, in the desired second format, and for printing or displaying the received routed document, in the desired second format.

Embodiments disclosed include a wireless communication device; a processing unit; a memory element coupled to the processing unit; a means for communicating over a network; wherein the wireless device is configured to: receive a document in a first format via a network. The wireless communication device further includes an assessment engine, configured to determine the first format of the received document, and to determine if the determined first format can be converted to a second desired format for printing or display. Embodiments disclosed further include a conversion engine configured to convert the received document to the second desired format if the determined first format can be converted to the second desired format. Also included, according to one embodiment, is a network routing engine configured to route the document over the network, to a cloud-based converter, if the determined first format cannot be converted to the second desired format. Further, the network routing engine is configured to message the cloud-based converter over the network; the message further includes an instruction to convert the routed document from the first format to the desired second format. The wireless communication device is further configured to receive, over the network, from the cloud-based converter, the routed document, in the desired second format, and to print or display the received routed document, in the desired second format.

DETAILED DESCRIPTION

Figure 1:
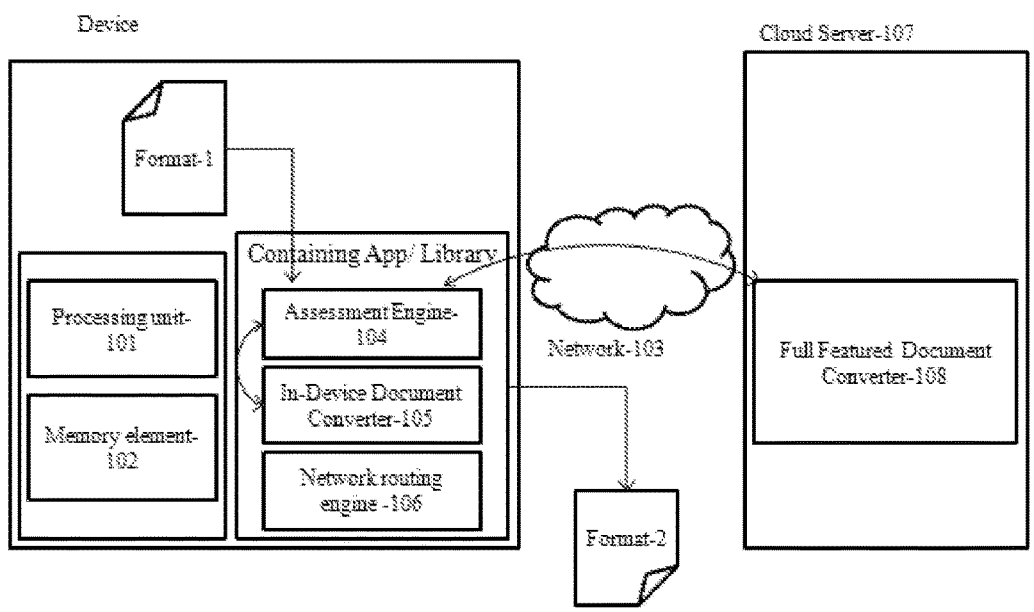
FIG. 1 illustrates the components included in the system according to an embodiment.

In the following description, for purposes of explanation, numerous specific details are set forth in order to provide a thorough understanding of the invention. It will be apparent, however, to one skilled in the art that the invention can be practiced without these specific details.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

Embodiments disclosed include a computer-automated system having a processing unit, a memory element coupled to the processing unit; a means for communicating over a network; wherein the computer system is configured to: via a network, receive a document in a first format; via an assessment engine, determine the first format of the received document. The assessment engine is also configured to determine if the determined first format can be converted to a second desired format for printing or display, and if the determined first format can be converted to the second desired format, a conversion engine is caused to convert the received document to the second desired format. If the determined first format cannot be converted to the second desired format, a network routing engine routes the document over the network to a cloud-based converter (e.g., a conversion engine). Further, the cloud-based conversion engine is messaged over the network, wherein the message further includes an instruction to convert the routed document from the first format to the desired second format. The computer-automated system can then receive, over the network, from the cloud-based converter, the routed document, in the desired second format, and print or display the received routed document, in the desired second format.

According to an embodiment, the computer-automated system includes a wireless communication device. In one embodiment, the wireless communication device is a mobile phone. Additional embodiments include tablet computers, laptops, smart phones, smart watches, and any mobile computing device.

According to an embodiment, the assessment engine is further caused to read the received document; based on the read document, determine a single or plurality of format features included in the read document; determine if any of the single or plurality of format features are convertible to the desired second format; and determine if any of the single or plurality of format features are non-convertible to the desired format. If any of the determined single or plurality of format features are convertible to the second desired format, the assessment engine is caused to route the said convertible features to a converter within in the computer-automated system and convert the routed said convertible features to the second desired format. Additionally, any determined non-convertible features are routed over the network to the cloud-based converter; a message is sent to the cloud-based converter over the network, wherein the sent message includes an instruction to convert the routed non-convertible features from the first format to the desired second format. The converted desired second format features are then received, over the network, from the cloud-based converter, and are re-routed to the converter within in the computer-automated system. These received features are then merged with the features converted to the second desired format by the converter within the computer-automated system. Finally, the computer-automated system prints or displays the received routed features, in the desired second format.

According to one embodiment, the assessment engine is further caused to, in the received document, unbundle the document format. For example, if the document is in .zip format, the assessment engine automatically unzips the .zip formatted document and accesses the constituent components (e.g., files.) Additionally, the assessment engine is caused to locate the component which has the file level metadata. File level metadata includes, for example, the number of pages contained in the received document, a page orientation, a page size, a location of pages, etc. The file level metadata is then decoded to decompose the document into individual/singular or multiple/plurality of pages. According to an embodiment, each page is loaded and decoded into its high level structural blocks. High level structural blocks in an embodiment includes headers, footers, text blocks, images, clip-art, etc. The assessment engine is configured to determine if the local conversion engine has the capability to handle conversion of all the high level structural blocks. Accordingly, the document is routed to the conversion engine, or the document is routed to a cloud-based conversion engine for cloud conversion. For each high level structural block, the assessment engine is configured to determine if all the attributes (e.g., fonts, text along a path, formatting attributes, superscript, subscript, image decoding algorithms) are available locally on the system. If not, the document is routed over a network, via a network routing engine, for cloud conversion. If all the blocks of a page can be converted locally, the page is marked for local conversion. If all the pages of a document can be converted locally, the entire document is marked for local conversion.

In an embodiment, the conversion engine is configured to convert each block, page, and/or document for local conversion. In another embodiment, the conversion engine is caused to render each block of a page, in raster format, and assemble the blocks to render the full page. Alternate embodiments include converting some features, determined by the assessment engine, accurately, while routing other features over the networking routing engine, to a cloud conversion engine. According to yet another embodiment, the conversion engine is configured to receive or issue a "save as" command through a runtime Application Programming Interface (API) to convert the document to the target format. The conversion engine is also configured for issuing a "print" command, registering itself (i.e., the conversion engine) as a dummy printer to print to. Additionally, the conversion engine then captures the print output in the standard print (e.g., GDI or PostScript) format and converts the standard print format to the target document format.

According to one embodiment, the speed of transfer and security during transfer are important from performance and security perspectives. The converter (e.g., conversion engine) uses HTTPS protocol with server certificates for secure transfer. It uses MTOM to optimize transfer of the file content. MTOM is the W3C Message Transmission Optimization Mechanism (MTOM), a method of efficiently sending binary data to and from Web services. Additionally, the converter uses a custom file partitioning, multi-threaded transfer, and re-assembly protocol to improve both upload and download file transfer speeds. During download, the converter downloads the target file one page at a time, so the file pages can be consumed by downstream software without waiting for the full file to download.

FIG. 1 illustrates the components included in the system according to an embodiment. The computer-automated system 100 includes the processing unit 101 coupled to memory element 102 and capable of communicating over a cellular or other network 103 to send and receive data, documents, and other forms of communication. Assessment engine 104 includes means to determine the format of the received document, and includes means to determine if the first format can be converted to a second desired format compatible for printing and/or display. Conversion engine 105 includes means to convert the received document to the second desired format compatible for printing and/or display. According to an alternate embodiment, the assessment engine 104 further includes means to identify features of the received file/document that are convertible by the conversion engine, and features that are not convertible, and the conversion engine is configured to convert the convertible features. If the determined first format can be converted to the second desired format, the conversion engine converts the received document to the second desired format. However, if the determined first format cannot be converted to the second desired format, network routing engine 106, routes the document over the network, to a cloud-based converter 108 comprised in a cloud server 107, and messages the cloud-based converter over the network, the message further includes an instruction to convert the routed document from the first format to the desired second format. Subsequently, the network routing engine receives over the network, from the cloud-based converter 108, the routed document, in the desired second format. The received document can now be printed and/or displayed by the computer-automated system.

An embodiment includes, in a computer-automated system having a processing unit coupled to a memory element and having instructions encoded thereon, a method including, over a network, receiving a document in a first format. The method further includes via an assessment engine, determining the first format of the received document, and determining if the determined first format can be converted to a second desired format for printing or display. If the determined first format can be converted to the second desired format, a conversion engine is configured for converting the received document to the second desired format. If the determined first format cannot be converted to the second desired format, a routing engine is configured for routing the document over the network, to a cloud-based converter (e.g., a conversion engine). The method further incorporates messaging the cloud-based converter over the network; the messaging includes instructing the cloud-based converter to convert the routed document from the first format to the desired second format. In the method, the computer-automated system is configured for receiving, over the network, from the cloud-based converter, the routed document, in the desired second format, and for printing or displaying the received routed document, in the desired second format.

According to an embodiment, the computer-automated system includes a wireless communication device. In one embodiment, the wireless communication device is a mobile phone. Additional embodiments include tablet computers, laptops, smart phones, smart watches, and any mobile computing device.

According to an embodiment of the disclosed method, the assessment engine is further configured for reading the received document. Based on the read document, the assessment engine is configured for determining a single or plurality of format features incorporated in the read document, for determining if any of the single or plurality of format features can be converted to the desired second format, and for determining those (if any) of the single or plurality of format features that cannot be converted to the desired format. Additionally, if any of the determined single or plurality of format features are convertible to the second desired format, the assessment engine is configured for routing the said convertible features to a conversion engine incorporated within the computer-automated system, and further for converting the routed said convertible features to the second desired format.

According to an embodiment of the disclosed method, the method further includes routing any determined non-convertible features over the network to the cloud-based converter. Additionally, embodiments include messaging the cloud-based converter over the network, wherein the messaging further includes an instruction to convert the routed non-convertible features from the first format to the desired second format, and receiving, over the network, from the cloud-based converter, the routed features, in the desired second format. The method also includes re-routing the received routed features to the converter incorporated within the computer-automated system, wherein the converter is configured for merging the features received over the network in the desired second format with the features converted to the second desired format. The computer-automated system is configured for printing or displaying the received routed features, in the desired second format.

According to another embodiment, the assessment engine is configured for unbundling the document format from the received document. For example, if the document is in .zip format, the assessment engine automatically unzips the .zip formatted document and accesses the constituent components (e.g., files.) Additionally, the assessment engine includes means for locating the component which has the file level metadata. File level metadata includes, for example, the number of pages contained in the received document, a page orientation, a page size, a location of pages, etc. The file level metadata is then decoded to decompose the document into individual/singular or multiple/plurality of pages. According to an embodiment, the method includes loading and decoding of each page into its high level structural blocks. High level structural blocks include, for example, headers, footers, text blocks, images, clip-art, etc. In the method, the assessment engine is configured for determining if the local conversion engine has capability to handle conversion of all the high level structural blocks. Accordingly, the document is routed to the conversion engine, or it is routed to a cloud-based conversion engine for cloud conversion. For each high level structural block, the assessment engine is configured for determining if all the attributes (e.g., fonts, text along a path, formatting attributes, superscript, subscript, image decoding algorithms) are available locally on the system. If not, the document is routed over a network, via a network routing engine, for cloud conversion. If all the blocks of a page can be converted locally, the page is marked for local conversion. If all the pages of a document can be converted locally, the entire document is marked it for local conversion.

In an embodiment, the conversion engine is configured for converting each block, page, and/or document for local conversion. The conversion engine includes means for rendering each block of a page, in raster format, and assembling the blocks to render the full page. Alternate embodiments include converting some features, determined by the assessment engine, accurately, while routing other features over the networking routing engine, to a cloud conversion engine. According to an example embodiment, the conversion engine is configured for receiving or issuing a "save as" command through a runtime API converting the document to the target format. The conversion engine is also configured for issuing a "print" command, registering itself (the conversion engine) as a dummy printer to which to print to. It then captures the print output in the standard print (e.g. GDI or PostScript) format and converts it to the target document format.

According to one embodiment, the speed of transfer and security during transfer are important from performance and security perspectives. The converter (e.g., a conversion engine) uses HTTPS protocol with server certificates for secure transfer. It uses MTOM for optimizing transfer of the file content. MTOM is the W3C Message Transmission Optimization Mechanism (MTOM), a method of efficiently sending binary data to and from Web services. Additionally, it uses a custom file partitioning, multi-threaded transfer, and re-assembly protocol to improve both upload and download file transfer speeds. During download, it downloads the target file one page at a time, so the file pages can be consumed by downstream software without waiting for the full file to download.

Figure 2:
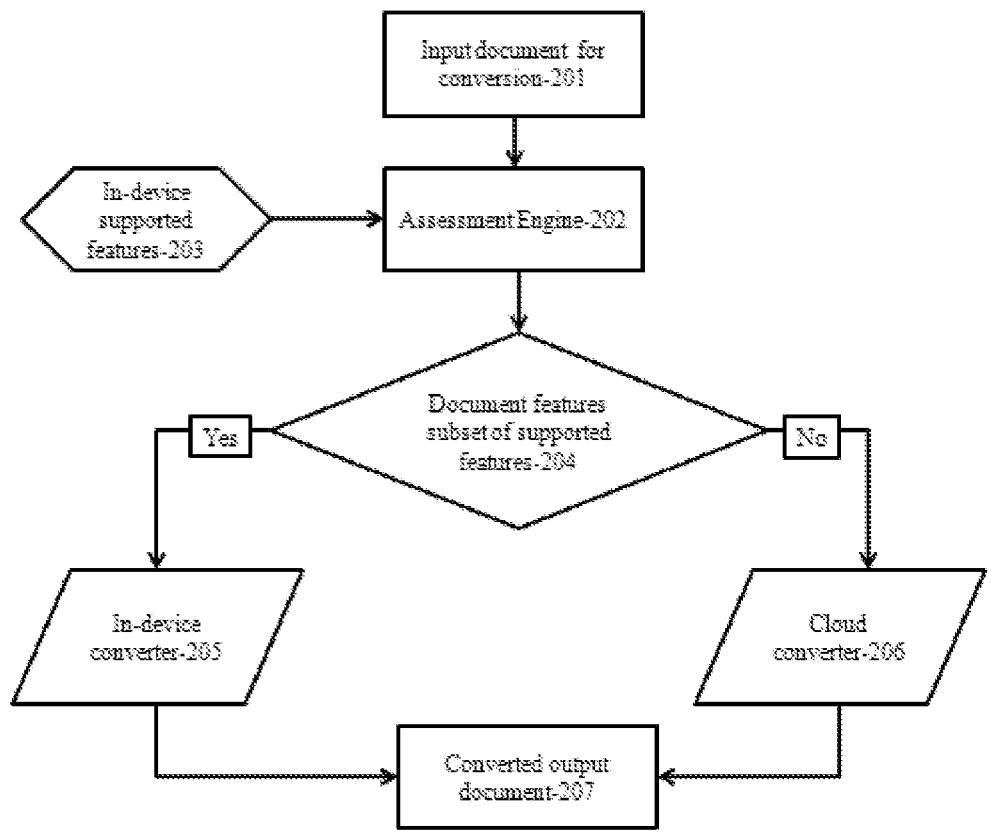
FIG. 2 illustrates via a flow diagram, the disclosed method according to an embodiment.

FIG. 2 illustrates via a flow diagram of the disclosed method according to an embodiment. In the method 200, the first step 201 comprises, over a network, receiving a document or file for conversion. The next step 202 comprises, via the assessment engine, determining the first format of the received document, and determining if the determined first format can be converted to a second desired format for printing or display. This step is followed by step 203 wherein in-device supported features are mapped to the received document or file features, and in one embodiment, the method includes feature by feature mapping to isolate features not convertible on the device or system. If it is determined that the features of the received document are a subset of the in-device supported features (step 204) the in-device converter (conversion engine) is caused to convert the document in step 205, to the desired format. If, however, in step 204, it is determined that the first format cannot be converted to the second desired format, the routing engine is caused to route the document over the network, to a cloud-based converter; and the cloud-based converter (conversion engine) is caused to convert the document to the desired format in step 206. In step 207 the converted document is displayed or/and printed.

Figure 3:
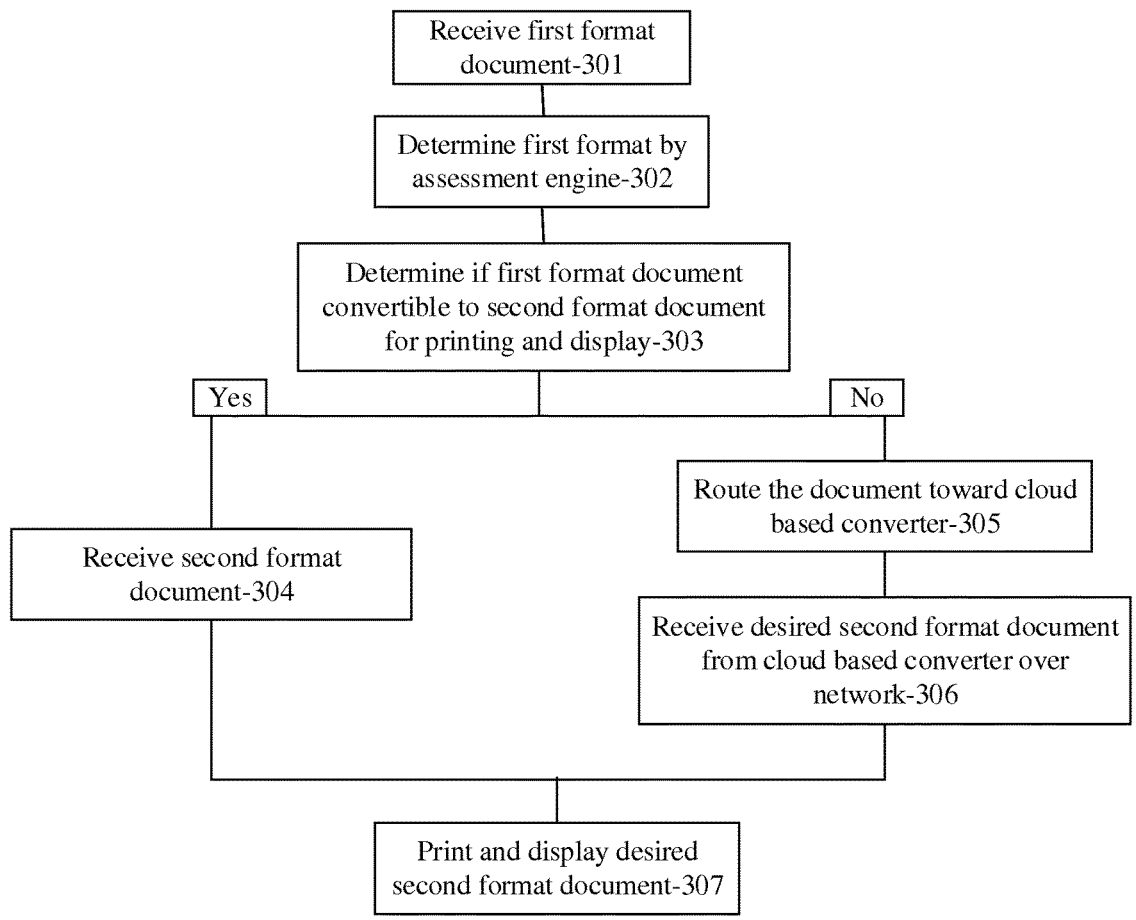
FIG. 3 illustrates a detailed process flow according to an embodiment.

FIG. 3 illustrates an alternate embodiment of the method. Step 301 includes receiving a document (data file) in a first format by a device. In step 302, the received first format is determined by the assessment engine comprised in the device. Step 303 involves determining if the first format is convertible to a desired second format locally by the device itself. If it is determined that the device can convert the document to the second format, then in step 304 the received document is converted to the second format, and in step 307 the second format is displayed in the desired form and optionally printed. On the other hand, if it is determined that the device cannot convert the document to the second format, then the document is routed via the network to a cloud based converter (step 305). In step 306 the device receives the document in the desired second format from the cloud based converter over the network, and in step 307 the second format is displayed in the desired form and optionally printed.

Embodiments disclosed include a wireless communication device comprising a processing unit, a memory element coupled to the processing unit; a means for communicating over a network; wherein the wireless is configured to receive a document in a first format via a network. The wireless communication device further comprises an assessment engine, configured to determine the first format of the received document, and to determine if the determined first format can be converted to a second desired format for printing or display. Embodiments disclosed further include a conversion engine configured to convert the received document to the second desired format if the determined first format can be converted to the second desired format. Also included, according to a one embodiment, is a network routing engine configured to route the document over the network, to a cloud-based converter (conversion engine), if the determined first format cannot be converted to the second desired format. And further the network routing engine is configured to message the cloud-based converter over the network, which message further comprises an instruction to convert the routed document from the first format to the desired second format. The wireless communication device is further configured to receive, over the network, from the cloud-based converter, the routed document, in the desired second format, and to print or display the received routed document, in the desired second format.

According to an embodiment, the wireless communication device is a mobile phone. Additional embodiments include tablet computers, laptops, smart phones, smart watches, and any mobile computing device.

According to an embodiment the assessment engine is further caused to read the received document. And based on the read document, the assessment engine determines a single or plurality of format features comprised in the read document, and further determines if any of the single or plurality of format features are convertible to the desired second format. According to a one embodiment, the assessment engine also determines if any or all of the single or plurality of format features are non-convertible to the desired format. Thus the assessment engine separates the determined convertible and non-convertible features, sending the convertible features to the conversion engine and the non-convertible features to the network routing engine, wherein the non-convertible features are then sent to the cloud-based conversion engine, via the network.

In one embodiment, if any of the determined single or plurality of format features are convertible to the second desired format, the conversion engine is caused to convert the said convertible features to the second desired format. Accordingly, the network routing engine is further configured to route any determined non-convertible features over the network to the cloud-based converter. The network routing engine further messages the cloud-based converter over the network, wherein the message further comprises an instruction to convert the routed non-convertible features from the first format to the desired second format. Subsequently, the wireless communication device receives, over the network, from the cloud-based converter, the routed features, in the desired second format. The received features in the said desired format are re-routed to the conversion engine. According to an embodiment, the conversion engine is caused to merge the features received over the network in the desired second format with the features converted to the second desired format by the conversion engine. The wireless communication device then prints or displays the received routed features, in the desired second format.

According to a one embodiment, the assessment engine is configured for unbundling the document format from the received document. For example, if the document is in zip format, the assessment engine automatically unzips the zip formatted document and accesses the constituent components (files.) Additionally, the assessment engine comprises means for locating the component which has the file level metadata. File level metadata includes, for example, the number of pages contained in the received document, a page orientation, a page size, a location of pages etc. The file level metadata is then decoded to decompose the document into individual/singular or multiple/plurality of pages. According to an embodiment, the method includes loading and decoding of each page into its high level structural blocks. High level structural blocks include, for example, headers, footers, text blocks, images, clip-art etc. In the method, the assessment engine is configured for determining if the local conversion engine has capability to handle conversion of all the high level structural blocks. Accordingly the document is routed to the conversion engine, or it is routed to a cloud-based conversion engine for cloud conversion. For each high level structural block, the assessment engine is configured for determining if all the attributes (e.g., fonts, text along a path, formatting attributes, superscript, subscript, image decoding algorithms) are available locally on the system. If not, the document is routed over the network, via a network routing engine, for cloud conversion. If all the blocks of a page can be converted locally, the page is marked for local conversion. If all the pages of a document can be converted locally, the entire document is marked for local conversion.

In an embodiment, the conversion engine is configured for converting each block, page, or/and document for local conversion. In one embodiment, the conversion engine comprises means for rendering each block of a page, in raster format, and assembling the blocks to render the full page. Alternate embodiments include converting some features, determined by the assessment engine, accurately, while routing other features over the networking routing engine, to a cloud conversion engine. According to an example embodiment, the conversion engine is configured for receiving or issuing a "save as" command through a runtime API for converting the document to the target format. The conversion engine is also configured for issuing a "print" command, registering itself (i.e., the conversion engine) as a dummy printer to print to. Additionally, the conversion engine then captures the print output in the standard print (e.g., GDI or PostScript) format and converts the standard print format to the target document format.

According to another embodiment, the speed of transfer and security during transfer are important from performance and security perspectives. The converter (i.e., conversion engine) uses HTTPS protocol with server certificates for secure transfer. It uses MTOM for optimizing transfer of the file content. MTOM is the W3C Message Transmission Optimization Mechanism (MTOM), a method of efficiently sending binary data to and from Web services. Additionally, it uses a custom file partitioning, multi-threaded transfer, and re-assembly protocol to improve both upload and download file transfer speeds. During download, it downloads the target file one page at a time, so the file pages can be consumed by downstream software without waiting for the full file to download.

Embodiments disclosed include, in a wireless communication device, a method including, receiving a document in a first format via a network, determining the first format of the received document, determining if the determined first format can be converted to a second desired format for printing or display, converting the received document to the second desired format if the determined first format can be converted to the second desired format, routing the document over the network, to a cloud-based converter, if the determined first format cannot be converted to the second desired format, messaging the cloud-based converter over the network, the message further including an instruction to convert the routed document from the first format to the desired second format, receiving, over the network, from the cloud-based converter, the routed document, in the desired second format, and printing or displaying the received routed document, in the desired second format.

According to an embodiment, the wireless communication device is a mobile phone. Additional embodiments include tablet computers, laptops, smart phones, smart watches, and any mobile computing device.

According to an embodiment of the disclosed method, the determining of the first format further includes first reading the received document in the first format. Based on the read document, determining a single or plurality of format features incorporated in the read document, determining if any of the single or plurality of format features are convertible to the desired second format; and determining if any of the single or plurality of format features are non-convertible to the desired format.

Accordingly, if any of the determined single or plurality of format features are convertible to the second desired format, the method includes converting the said convertible features to the second desired format. For features determined to be non-convertible by the on-board conversion engine incorporated within the wireless communication device, the method includes routing any determined non-convertible features over the network to the cloud-based converter. Further, the method includes messaging the cloud-based converter over the network, which messaging includes an instruction to convert the routed non-convertible features from the first format to the desired second format. Subsequently, and in accordance with an embodiment of the method, the method includes receiving, over the network, from the cloud-based converter, the routed features, in the desired second format, and merging the features received over the network in the desired second format with the features converted to the second desired format. The received, routed, and merged features are then sent for printing or displaying on the wireless communication device.

Since various possible embodiments might be made from the disclosure above, and since various changes might be made in the embodiments above set forth, it is to be understood that all matter herein described or shown in the accompanying drawings is to be interpreted as illustrative, and not to be considered limiting in any sense. Thus, it will be understood by those skilled in the art that although the embodiments have been shown and described in accordance with the Patent Statutes, the invention is not limited thereto or thereby.

The figures illustrate the architecture, functionality, and operation of possible implementations of systems and methods according to various embodiments of the disclosure. It should also be noted that, in some alternative implementations, the functions noted or illustrated might occur out of the order noted in the figures. For example, two blocks shown in succession may, in fact, be executed substantially, concurrently, or the blocks may sometimes be executed in the reverse order, depending upon the functionality involved.

The terminology used herein is for the purpose of describing particular embodiments only, and is not intended to limit the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In general, the steps executed to implement the embodiments of the invention, may be part of an automated or manual embodiment, and programmable to follow a sequence of desirable instructions.

Embodiments disclosed overcome technical inefficiencies in existing systems and methods. Document format conversion for display and printing is a key functionality of productivity applications in computing devices. Embodiments disclosed enable this functionality on smaller processing powered mobile devices, and generally on smaller wireless communication devices. Disclosed embodiments solve and address conflicting requirements of quality, fidelity, and processing speed. Embodiments combine the power of cloud-based conversion engines for high fidelity of the rendered output, with in-device conversion algorithms for extremely high speed processing, via an in-device assessment engine for isolating in-device convertible data from non-convertible data.

This disclosure and some of its advantages have been described in detail for some embodiments. It should be understood that although some example embodiments of the method and system for hybrid document conversion, display, printing, etc. for a variety of computing devices has been disclosed, the system and method is highly reconfigurable, and embodiments include reconfigurable systems that may be dynamically adapted to be used in other contexts as well. It should also be understood that various changes, substitutions and alterations can be made herein without departing from the spirit and scope of the disclosure as defined by the appended claims. An embodiment of the disclosure may achieve multiple objectives, but not every embodiment falling within the scope of the attached claims will achieve every objective. Moreover, the scope of the disclosure is not intended to be limited to the particular embodiments of the process, machine, manufacture, and composition of matter, means, methods and steps described in the specification. A person having ordinary skill in the art will readily appreciate from the disclosure that processes, machines, manufacture, compositions of matter, means, methods, or steps, presently existing or later to be developed are equivalent to, and fall within the scope of, what is claimed. Accordingly, the appended claims are intended to include within their scope such processes, machines, manufacture, compositions of matter, means, methods, or steps.

We claim:

1. A computer-automated system comprising:
a processing unit;
a memory element coupled to the processing unit;
a wireless communication device for communicating over a wireless network;
wherein the computer-automated system is configured to:
over the network, receiving a document in a first format;
determining a single or plurality of format features comprised in the document;
via an assessment engine, determining if the first format can be converted to a second format for printing or displaying of the received document;
in case where any of the single or plurality of format features is determined convertible to the second format:
routing the convertible features to a local conversion engine comprised in the computer-automated system;
converting the routed convertible features to the second format;
in case where any of the single or plurality of format features is determined not convertible to the second format:
routing any determined non-convertible features over the network to the cloud-based conversion engine;
messaging the cloud-based conversion engine over the network, the messaging further comprising an instruction to convert the routed non-convertible features from the first format to the second format;
receiving, over the network, from the cloud-based conversion engine, the routed features, in the second format;
re-routing the received routed features to the local conversion engine comprised in the computer-automated system;
merging the features received over the network by the cloud-based conversion engine in the second format with the features converted to the second format by the local conversion engine;
unbundling the received document in the second format;
locating a component that comprises a file level metadata;
decoding the file level metadata;
based on the decoded file level metadata, printing or displaying the converted document in the second format.

2. The computer automated system of claim 1 wherein the computer automated system is further configured to, in routing the document over the network to the cloud-based conversion engine:
message the cloud-based conversion engine over the network, wherein the message further comprises an instruction to convert the routed document from the first format to a the second format.

3. The computer automated system of claim 1 wherein the computer-automated system is a wireless communication device.

4. In a computer-automated system configured to communicate over a wireless network, a method comprising:
via a network, receiving a document in a first format;
determining a single or plurality of format features comprised in the document;
via an assessment engine, determining if the first format can be converted to a second format for printing or displaying of the received document:
in case where any of the single or plurality of format features is determined convertible to the second format:
routing the convertible features to a local conversion engine comprised in the computer-automated system;
converting the routed convertible features to the second format;

in case where any of the single or plurality of format features is determined not convertible to the second format:
routing any determined non-convertible features over the network to the cloud-based conversion engine;
messaging the cloud-based conversion engine over the network, the messaging further comprising an instruction to convert the routed non-convertible features from the first format to the second format;
receiving, over the network, from the cloud-based conversion engine, the routed features, in the second format;
re-routing the received routed features to the local conversion engine comprised in the computer-automated system;
merging the features received over the network by the cloud-based conversion engine in the second format with the features converted to the second format by the local conversion engine;

unbundling the received document in the second format;
locating a component that comprises a file level metadata;
decoding the file level metadata;
based on the decoded file level metadata, printing or displaying the converted document in the second format.

5. The method of claim 4 further comprising, in routing the document over the network to the cloud-based conversion engine;
messaging the cloud-based conversion engine over the network, wherein the messaging further comprises an instruction to convert the routed document from the first format to the second format; and
converting by the cloud-based conversion engine the document to the second format.

6. The method of claim 4 wherein the computer-automated system is a wireless communication device.

* * * * *